US008255145B2

(12) United States Patent
Murata et al.

(10) Patent No.: US 8,255,145 B2
(45) Date of Patent: Aug. 28, 2012

(54) TRAVEL TIME CALCULATION SERVER, A TRAVEL TIME CALCULATING APPARATUS USED FOR A VEHICLE AND A TRAVEL TIME CALCULATION SYSTEM

(75) Inventors: Kenichi Murata, Nissin (JP); Kazutaka Yoshikawa, Tokyo (JP); Tomoyuki Zaitsu, Tokyo (JP); Kenji Nagase, Okazaki (JP); Hiroki Ishikawa, Anjyo (JP)

(73) Assignees: Toyota Jidosha Kabushiki Kaisha, Toyota-shi (JP); Aisin AW Co., Ltd., Anjo-shi (JP)

( * ) Notice: Subject to any disclaimer, the term of this patent is extended or adjusted under 35 U.S.C. 154(b) by 447 days.

(21) Appl. No.: 12/528,851

(22) PCT Filed: Feb. 26, 2008

(86) PCT No.: PCT/JP2008/053278
§ 371 (c)(1),
(2), (4) Date: Aug. 27, 2009

(87) PCT Pub. No.: WO2008/105403
PCT Pub. Date: Sep. 4, 2008

(65) Prior Publication Data
US 2010/0049428 A1    Feb. 25, 2010

(30) Foreign Application Priority Data
Feb. 27, 2007    (JP) ................................. 2007-047544

(51) Int. Cl.
*G06F 19/00*    (2006.01)
(52) U.S. Cl. ...................................................... 701/118

(58) Field of Classification Search .................. 701/118, 701/117, 119, 120
See application file for complete search history.

(56) References Cited

U.S. PATENT DOCUMENTS

| 6,873,908 | B2 * | 3/2005 | Petzold et al. | 701/414 |
|---|---|---|---|---|
| 7,155,335 | B2 * | 12/2006 | Rennels | 701/117 |
| 7,546,206 | B1 * | 6/2009 | Miller et al. | 701/415 |
| 7,617,041 | B2 * | 11/2009 | Sera | 701/119 |
| 7,706,966 | B2 * | 4/2010 | Tomita et al. | 701/117 |
| 7,739,029 | B2 * | 6/2010 | Ishikawa et al. | 701/117 |
| 7,797,100 | B2 * | 9/2010 | Zaitsu et al. | 701/117 |
| 7,797,101 | B2 * | 9/2010 | Tanaka | 701/117 |
| 7,894,980 | B2 * | 2/2011 | Liu et al. | 701/118 |
| 7,899,611 | B2 * | 3/2011 | Downs et al. | 701/117 |
| 2008/0077316 | A1 * | 3/2008 | Yamane et al. | 701/119 |
| 2009/0018759 | A1 * | 1/2009 | Endo et al. | 701/117 |
| 2009/0112453 | A1 * | 4/2009 | Mo et al. | 701/119 |
| 2011/0288756 | A1 * | 11/2011 | Chapman et al. | 701/118 |

(Continued)

FOREIGN PATENT DOCUMENTS
JP    10-232991 A    9/1998
(Continued)

*Primary Examiner* — Faye M. Fleming
(74) *Attorney, Agent, or Firm* — Kenyon & Kenyon LLP (57) ABSTRACT

A travel time calculation server is provided which comprises: a probe data reception part 31 configured to receive travel time data of an intersection node 6 through which a vehicle 3 passes as well as a traffic event of each of links 1-4 connecting to the intersection node; and a right and left turn cost generating part 33 configured to store a table, which stores the travel time data of the intersection node 6 associated with combinations of traffic events of the links 1-4, in storage means 35.

11 Claims, 10 Drawing Sheets

U.S. PATENT DOCUMENTS

2011/0313633 A1 * 12/2011 Nath et al. .................. 701/70

FOREIGN PATENT DOCUMENTS

| | | |
|---|---|---|
| JP | 3279009 B2 | 4/2002 |
| JP | 2002-342879 A | 11/2002 |
| JP | 2004-264326 A | 9/2004 |
| JP | 3591243 B2 | 11/2004 |
| JP | 2004-354086 A | 12/2004 |
| JP | 2006-023176 A | 1/2006 |
| JP | 2006-047246 A | 2/2006 |
| JP | 2006-125850 A | 5/2006 |
| JP | 2006-244265 A | 9/2006 |
| JP | 2007-248183 A | 9/2007 |
| JP | 2007-271518 A | 10/2007 |
| WO | WO 9931638 A1 * | 6/1999 |

* cited by examiner

| LINK ID INFORMATION | RIGHT/LEFT TURN | RIGHT/LEFT TURN TIME | LINK TRAVEL TIME OF LINK 1 | TRAFFIC EVENT OF EVERY LINK | | | | TIME OF PASSAGE |
|---|---|---|---|---|---|---|---|---|
| | | | | LINK 1 | LINK 2 | LINK 3 | LINK 4 | |
| LINK 1 | RIGHT TURN | $T_{14}$ | $T_v$ | $V_1$ | $V_2$ | $V_3$ | $V_4$ | 20XX YEAR XX MONTH XX DAY XX O'CLOCK XX MINUTES |
| LINK n | LEFT TURN | $T_{nn}$ | $T_r$ | $V_n$ | ... | ... | LINK m $V_m$ | 20XX YEAR XX MONTH XX DAY XX O'CLOCK XX MINUTES |

FIG.4B

| LINK ID INFORMATION | RIGHT/LEFT TURN | RIGHT/LEFT TURN TIME | LINK TRAVEL TIME OF LINK 1 | TRAFFIC EVENT OF EVERY LINK | | | | TIME OF PASSAGE |
|---|---|---|---|---|---|---|---|---|
| | | | | LINK 1 | LINK 2 | LINK 3 | LINK 4 | |
| LINK 1 | RIGHT TURN | $T_{14}$ | $T_v$ | TRAFFIC JAM | TRAFFIC JAM | WIDE-OPEN TRAFFIC | TRAFFIC JAM | 20XX YEAR XX MONTH XX DAY XX O'CLOCK XX MINUTES |
| LINK n | LEFT TURN | $T_{nn}$ | $T_r$ | TRAFFIC JAM | ... | ... | LINK m TRAFFIC JAM | 20XX YEAR XX MONTH XX DAY XX O'CLOCK XX MINUTES |

| TRAFFIC EVENT OF LINK 1 | LEFT TURN DIRECTION | | RIGHT TURN DIRECTION | | |
|---|---|---|---|---|---|
| | TRAFFIC EVENT OF LINK 2 | RIGHT AND LEFT TURN COST | TRAFFIC EVENT OF LINK 4 | TRAFFIC EVENT OF LINK 3 | RIGHT AND LEFT TURN COST |
| TRAFFIC JAM | TRAFFIC JAM | X1 SECONDS | TRAFFIC JAM | HEAVY TRAFFIC JAM | Y1 SECONDS |
| | | | | LIGHT TRAFFIC JAM | Y2 SECONDS |
| | | | | BUSY TRAFFIC | Y3 SECONDS |
| | | | | LIGHT TRAFFIC | Y4 SECONDS |
| | | | | SPEEDY TRAFFIC 1 | Y5 SECONDS |
| | | | | SPEEDY TRAFFIC 2 | Y6 SECONDS |
| | HEAVY TRAFFIC | X2 SECONDS | HEAVY TRAFFIC | HEAVY TRAFFIC JAM | Y7 SECONDS |
| | | | | LIGHT TRAFFIC JAM | Y8 SECONDS |
| | | | | BUSY TRAFFIC | Y9 SECONDS |
| | | | | LIGHT TRAFFIC | Y10 SECONDS |
| | | | | SPEEDY TRAFFIC 1 | Y11 SECONDS |
| | | | | SPEEDY TRAFFIC 2 | Y12 SECONDS |
| | WIDE-OPEN TRAFFIC | X3 SECONDS | WIDE-OPEN TRAFFIC | HEAVY TRAFFIC JAM | Y13 SECONDS |
| | | | | LIGHT TRAFFIC JAM | Y14 SECONDS |
| | | | | BUSY TRAFFIC | Y15 SECONDS |
| | | | | LIGHT TRAFFIC | Y16 SECONDS |
| | | | | SPEEDY TRAFFIC 1 | Y17 SECONDS |
| | | | | SPEEDY TRAFFIC 2 | Y18 SECONDS |
| HEAVY TRAFFIC | TRAFFIC JAM | X'1 SECONDS | TRAFFIC JAM | HEAVY TRAFFIC JAM | Y'1 SECONDS |
| | | | | LIGHT TRAFFIC JAM | Y'2 SECONDS |
| | | | | BUSY TRAFFIC | Y'3 SECONDS |
| | | | | LIGHT TRAFFIC | Y'4 SECONDS |
| | | | | SPEEDY TRAFFIC 1 | Y'5 SECONDS |
| | | | | SPEEDY TRAFFIC 2 | Y'6 SECONDS |
| | HEAVY TRAFFIC | X'2 SECONDS | HEAVY TRAFFIC | HEAVY TRAFFIC JAM | Y'7 SECONDS |
| | | | | LIGHT TRAFFIC JAM | Y'8 SECONDS |
| | | | | BUSY TRAFFIC | Y'9 SECONDS |
| | | | | LIGHT TRAFFIC | Y'10 SECONDS |
| | | | | SPEEDY TRAFFIC 1 | Y'11 SECONDS |
| | | | | SPEEDY TRAFFIC 2 | Y'12 SECONDS |
| | WIDE-OPEN TRAFFIC | X'3 SECONDS | WIDE-OPEN TRAFFIC | HEAVY TRAFFIC JAM | Y'13 SECONDS |
| | | | | LIGHT TRAFFIC JAM | Y'14 SECONDS |
| | | | | BUSY TRAFFIC | Y'15 SECONDS |
| | | | | LIGHT TRAFFIC | Y'16 SECONDS |
| | | | | SPEEDY TRAFFIC 1 | Y'17 SECONDS |
| | | | | SPEEDY TRAFFIC 2 | Y'18 SECONDS |
| WIDE-OPEN TRAFFIC | TRAFFIC JAM | X"1 SECONDS | TRAFFIC JAM | HEAVY TRAFFIC JAM | Y"1 SECONDS |
| | | | | LIGHT TRAFFIC JAM | Y"2 SECONDS |
| | | | | BUSY TRAFFIC | Y"3 SECONDS |
| | | | | LIGHT TRAFFIC | Y"4 SECONDS |
| | | | | SPEEDY TRAFFIC 1 | Y"5 SECONDS |
| | | | | SPEEDY TRAFFIC 2 | Y"6 SECONDS |
| | HEAVY TRAFFIC | X"2 SECONDS | HEAVY TRAFFIC | HEAVY TRAFFIC JAM | Y"7 SECONDS |
| | | | | LIGHT TRAFFIC JAM | Y"8 SECONDS |
| | | | | BUSY TRAFFIC | Y"9 SECONDS |
| | | | | LIGHT TRAFFIC | Y"10 SECONDS |
| | | | | SPEEDY TRAFFIC 1 | Y"11 SECONDS |
| | | | | SPEEDY TRAFFIC 2 | Y"12 SECONDS |
| | WIDE-OPEN TRAFFIC | X"3 SECONDS | WIDE-OPEN TRAFFIC | HEAVY TRAFFIC JAM | Y"13 SECONDS |
| | | | | LIGHT TRAFFIC JAM | Y"14 SECONDS |
| | | | | BUSY TRAFFIC | Y"15 SECONDS |
| | | | | LIGHT TRAFFIC | Y"16 SECONDS |
| | | | | SPEEDY TRAFFIC 1 | Y"17 SECONDS |
| | | | | SPEEDY TRAFFIC 2 | Y"18 SECONDS |

TRAVEL TIME IN THE CASE OF RIGHT TURN $$= \left(1 + \frac{B}{A}\right) \times T$$

A: LINK LENGTH
B: RIGHT TURN COST
T: TRAVEL TIME ACCORDING TO VICS

FIG.10A

TRAVEL TIME CALCULATION SERVER, A TRAVEL TIME CALCULATING APPARATUS USED FOR A VEHICLE AND A TRAVEL TIME CALCULATION SYSTEM

This is a 371 national phase application of PCT/JP2008/053278 filed 26 Feb. 2008, which claims priority to Japanese Patent Application No. 2007-047544 filed 27 Feb. 2007, the contents of which are incorporated herein by reference.

TECHNICAL FIELD

The present invention relates to a travel time calculation server, a travel time calculating apparatus used for a vehicle and a travel time calculation system which provide an arrival time at a goal. Specifically, the present invention relates to a travel time calculation server, a travel time calculating apparatus used for a vehicle and a travel time calculation system which provide the arrival time reflecting the current traffic events.

BACKGROUND ART

A navigation system is used which measures a position of a vehicle with positioning techniques utilizing artificial satellites and displays map around the vehicle together with the position of the vehicle based on map information stored in advance. The navigation system searches for a route which minimizes a cost to the goal (an arrival time, for example) when the goal is input, displays the searched route on the map, and provides a traveling direction such as right turn and left turn before the vehicle reaches an intersection. The arrival time at the goal largely depends on a situation of traffic of roads. It is possible to predict the arrival time more precisely using traffic information (for example, link travel times, traffic restrictions, traffic jam information, etc.) distributed by road side facilities such as VICS (Vehicle Information and Communication System).

However, the travel time distributed by VICS is a travel time when the vehicle proceeds straight forward at every section (referred to as "link" hereafter). Thus, an excess travel time due to right or left turn (referred to as "a right and left turn cost" hereafter) is not taken into consideration. For example, if the road in a right-turn direction or left-turn direction is busy when the road in a straight forward direction is not busy, time required for the right turn or the left turn becomes longer than a travel time in the straight forward direction. Thus, the travel time predicted using VICS may have reduced accuracy because the right and left turn cost is not taken into consideration.

Figure 10A:
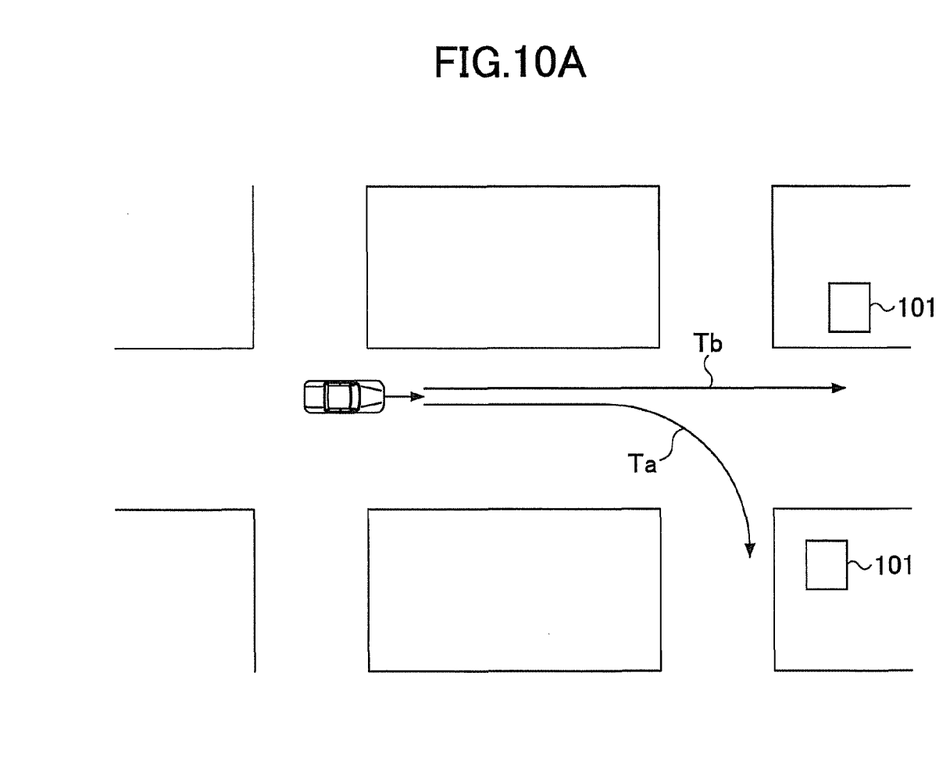
FIGS. 10A and 10B are diagrams for illustrating examples of a right and left turn cost according to prior art.

In this connection, JP patent No. 3591243 (referred to as '243 patent) proposes a technique which attempts to obtain accurate travel time at the right or left turn by calculating the right and left turn cost. FIG. 10A shows a diagram for illustrating the calculation of the time required for the right turn in '243 patent. Each intersection is provided with a terminal apparatus 101 to which a vehicle transmits the travel time whenever it passes through the link. In FIG. 10A, the right and left turn cost is calculated by subtracting the travel time Tb of the vehicle which proceeded straight forward from the travel time Ta of the vehicle which turned right (i.e., Ta−Tb).

Figure 10B:
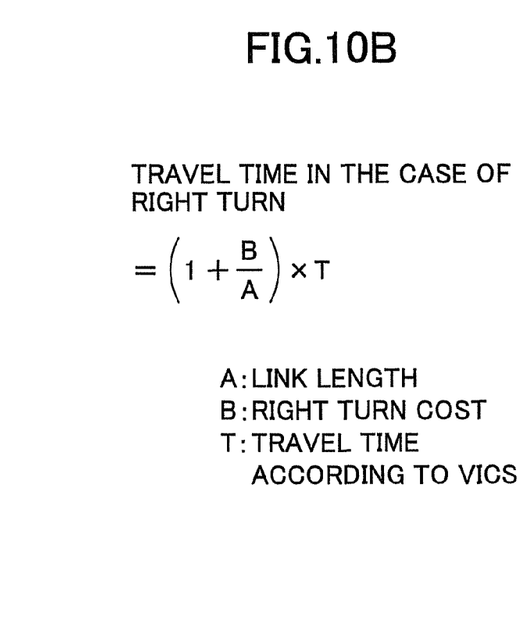

Further, JP patent No. 3279009 (referred to as '009 patent) proposes a technique which calculates travel time at the right or left turn by adding the right and left turn cost to the travel time obtained from VICS. FIG. 10B shows a formula for calculating the travel time at the right turn disclosed in '009 patent. In FIG. 10B, the right turn cost is calculated as a function of a flow-in speed in an opposite lane into the intersection and a flow-out speed from the intersection into a lane into which the right turn is performed, each speed is obtained from VICS, and the travel time at the right turn is calculated by correcting the travel time T with the right turn cost and the left turn cost.

However, the right and left turn cost may vary greatly depending on traffic events such as traffic in the opposite lane, visibility of the intersection, etc. Thus, a certain degree of traffic of vehicles which perform right and left turn is necessary in order to precisely recognize the right and left turn cost. In this connection, according to the technique disclosed in '243 patent, it is not possible to precisely calculate the right and left turn cost if the travel time of the intersection which could be included in the route, in the current situation (referred to as real time) under which the arrival time is to be predicted.

Further, the right and left turn cost calculated according to the technique disclosed in '009 patent utilizes the travel time distributed from VICS when the right and left turn cost is calculated. Thus, it is not possible to precisely calculate the arrival time unless the traffic events at the time of calculating the right and left turn cost are approximately the same as the traffic events in real time.

In other words, in order to precisely predict the arrival time reflecting the right and left turn cost, it is desired that the right and left turn cost suited for the traffic events in real time be available. However, conventionally, a technique of recognizing the right and left turn costs reflecting the traffic events in real time does not exist.

DISCLOSURE OF INVENTION

Therefore, an object of the present invention is to provide a travel time calculation server, a travel time calculating apparatus used for a vehicle and a travel time calculation system which can precisely calculate an arrival time using the right and left turn costs reflecting the traffic events in real time.

In order to solve the aforementioned problems, according to the present invention, a travel time calculation server is provided which comprises; a probe data reception part configured to receive travel time data of an intersection node through which a vehicle passes as well as a traffic event of each of links connecting to the intersection node; and a right and left turn cost generating part configured to store a table on an intersection node basis in storage means, said table storing the travel time data of the intersection node associated with a combination of a traffic event of the link entering the intersection node and a traffic event of the link connected to the intersection node in a left turn direction, and a combination of a traffic event of the link entering the intersection node, a traffic event of the link connected to the intersection node in a right turn direction and a traffic event of the link opposite to the link entering the intersection node.

According to the present invention, since the travel time data of the intersection can be accumulated in such a manner that it is associated with combinations of traffic events of the links connecting to the intersection in real time, it is possible to utilize the previous travel time data as the current traffic information.

Further, in one embodiment of the present invention, the travel time calculation server has current traffic event acquisition means (VICS reception part 14a, for example) configured to acquire current traffic events of the links (VICS traffic information, for example); and a route search part configured to extract the intersection node included in a route toward a predetermined goal, characterized in that the route search part extracts the current traffic events of the links connecting to the intersection node in the route from the current traffic events acquired by the current traffic event acquisition means, and predicts an arrival time at the goal using the travel time data extracted from the table, said travel time data being extracted according to the combination of the current traffic events of the links.

According to the present invention, since the travel time data of the intersections accumulated previously are extracted according to the combination of current traffic events of the links connecting to the intersection node, it is possible to use the previous travel time data as the current travel time data in calculating the arrival time at the goal.

Further, in one embodiment of the present invention, the right and left turn cost generating part generates right and left turn costs on an intersection node basis based on the probe data, and stores a right and left turn cost table on an intersection node basis, which table stores the generated right and left turn costs associated with combinations of traffic events of the links, in the storage means.

According to the present invention, it is possible to store a right and left turn cost table which defines travel time of nodes.

Further, in one embodiment of the present invention, the traffic event is a degree of traffic jam consisting of traffic jam, heavy traffic and wide-open traffic.

According to the present invention, it is possible to extract the previously accumulated time data of time required for the right and left turn based on the current degree of traffic jam of the respective links connecting to the intersection, and use it for calculation of the arrival time in the current situation.

Further, in one embodiment of the present invention, the traffic event is link travel time or link passage speed of the link connecting to the intersection node.

The traffic events may be represented by link travel time or link passage speed. Thus, it is possible to obtain time data of time required for the right and left turn at the intersection node from the combination thereof.

Further, in one embodiment of the present invention, the right and left turn cost generating part stores the table in the storage means on a cost factor basis, said cost factor being a time period, a season, a day of the week, a national or public holiday, year end and new year, golden week, Bon festival, or the like.

According to the present invention, it is possible to provide an accurate link cost in response to a right and left turn cost which varies due to cost factors such as a time period, a day of the week, a holiday, etc.

Further, in one embodiment of the present invention, the travel time calculation server has a route search request reception part configured to receive current vehicle position information and goal information from the vehicle, and the route search part predicts the arrival time at the goal of the goal information and notifies the vehicle of the predicted arrival time.

According to the present invention, it is possible to provide the vehicle with an accurate arrival time calculated using the travel time data extracted based on the current traffic information.

Further, in one embodiment of the present invention, the server extracts time required for right turn or left turn from the travel time data extracted from the table according to the combination of current traffic events, and transmits the extracted time to a vehicle which outputs the extracted time in an audio or visual manner, or transmits the extracted time to road side facilities.

According to the present invention, it is possible to provide the driver of the vehicle with time required for a right turn or a left turn.

Further, in one embodiment of the present invention, the route search part predicts the arrival time at the goal using the travel time data which the probe data reception part receives instead of using the travel time data stored in the table, as far as the intersection node whose travel time data is received by the probe data reception part is concerned.

According to the present invention, it is possible to precisely predict the arrival time by utilizing the current travel time data with respect to the intersection node whose current travel time data is obtained.

In summary, according to the present invention, it is possible to provide a travel time calculation server, a travel time calculating apparatus used for a vehicle and a travel time calculation system which can precisely calculate an arrival time using the right and left turn costs reflecting the traffic events in real time.

EXPLANATION FOR REFERENCE NUMBER 1 travel time calculation system
2 traffic information distribution center
3 probe car
5 road side beacon apparatus
10 travel time calculating apparatus used for a vehicle
15 position determination part
16 map database
17 clock
18 right and left turn data editing part
19 probe data accumulating part
20 control part
21 probe data transmission part
22 right and left turn cost table reception part
23,35 right and left turn cost table storage part
24, 24a route search part
30 processing part
31 probe data reception part
32 probe data storage part
33 right and left turn cost generating part
34 distribution information generating part 36 data distribution part
37 route search request reception part

BEST MODE FOR CARRYING OUT THE INVENTION

In the following, the best mode for carrying out the present invention will be described in detail by referring to the accompanying drawings.

Figure 1:
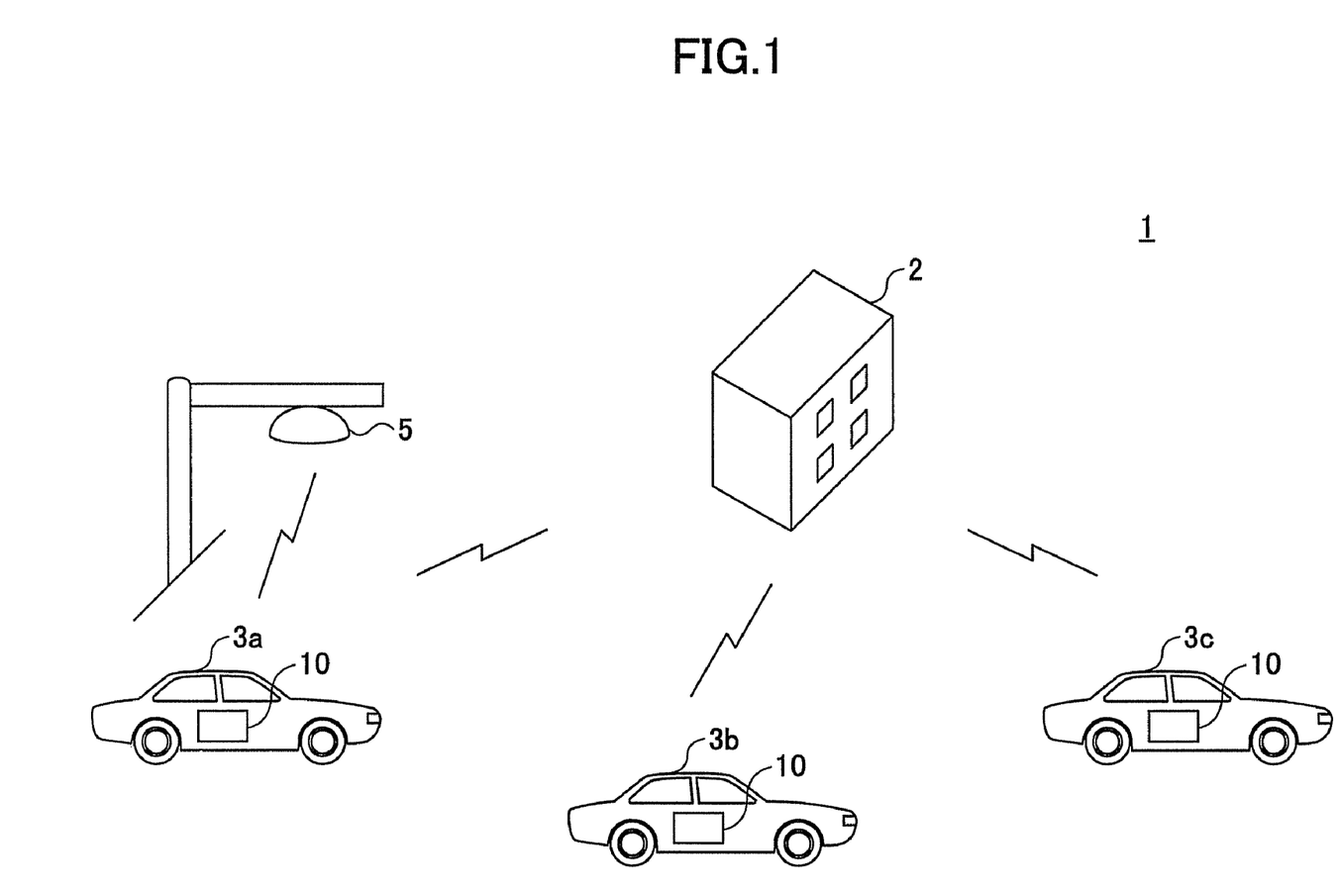
FIG. 1 is a schematic system diagram of a travel time calculation system.

FIG. 1 is a schematic system diagram of a travel time calculation system 1 according to the present embodiment. Each of Probe cars 3a-3c (also referred to as a probe car 3 hereafter) has a travel time calculating apparatus used for a vehicle mounted thereon, transmits probe data to a traffic information distribution center 2 via a roadside beacon 5 or mobile phone networks, and receives probe traffic information from the traffic information distribution center 2. Further, the probe car 3 receives traffic information which VICS (i.e., Vehicle Information and Communication System) provides and can utilize it in predicting an arrival time at a goal. It is noted that although there is a vehicle which doesn't transmit or receive probe data, such a simple vehicle is also referred to as a probe car 3.

In the travel time calculation system 1 according to the present embodiment, when the probe car 3 passes through the intersection through right or left turn, the probe car 3 transmits the travel time at that time. In this way, the traffic information distribution center 2 accumulates travel time other than travel time at the time of proceeding straight forward (referred to as a right and left turn cost hereafter), which is not provided by VICS or the like. The right and left turn cost is an excess time taken with respect to link travel time due to right or left turn, and is accumulated on an intersection basis. Further, associating the right and left turn cost with traffic events such as a traffic jam in accumulating allows calculating an accurate arrival time by extracting an appropriate right and left turn cost suited for the traffic event under the current situation (referred to as "in real time" hereafter) when the probe car 3 predicts the arrival time at the goal.

[A Travel Time Calculating Apparatus 10]

Figure 2:
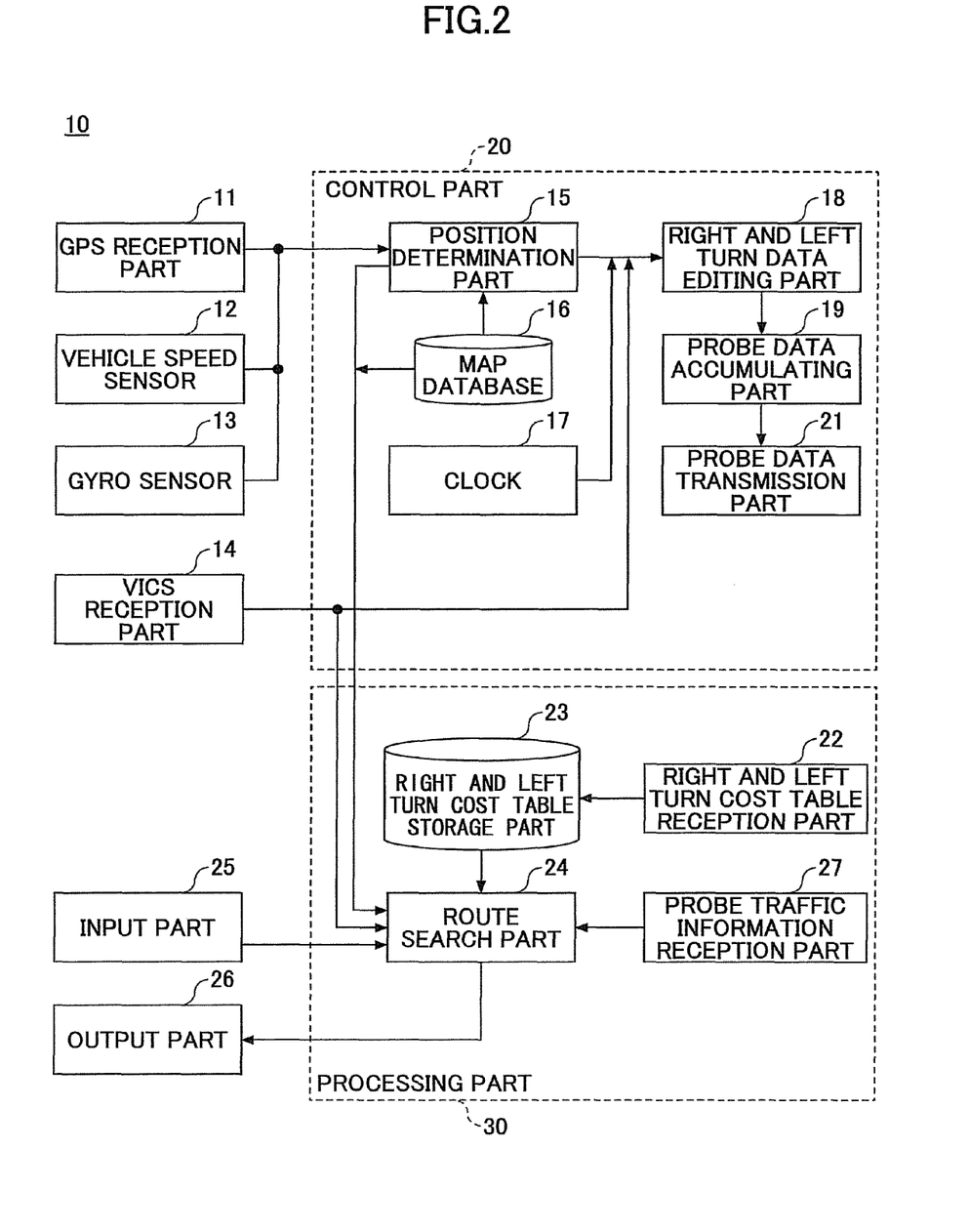
FIG. 2 is a block diagram of an example of a travel time calculating apparatus used for a vehicle.

FIG. 2 is a block diagram of an example of the travel time calculating apparatus 10 used for a vehicle. The travel time calculating apparatus 10 used for a vehicle has a GPS reception part 11 for receiving electric waves from GPS (Global Positioning System) satellites, a vehicle speed sensor 12 for detecting speed of the respective wheels, a gyro sensor 13 for detecting a traveling direction of the probe car 3, a VICS reception part 14 for receiving VICS traffic information transmitted via beacons and FM multiplex broadcasting, a control part 20 and a processing part 30. The control part 20 has a position determination part 15, a right and left turn data editing part 18 and a probe data transmission part 21 which are implemented by programs performed by the CPU of a microcomputer or hardware resources such as ASIC (Application Specific Integrated Circuit). Further, the control part 20 has a map database 16 which is implemented by storage means of the microcomputer such as a hard disk drive, a flash memory, RAM, etc., and a probe data accumulating part 19.

The position determination part 15 estimates the position of the vehicle based on the arrival time of the electric waves radiated from the GPS satellites, and estimates the position of the vehicle precisely utilizing autonomous navigation in which a vehicle speed detected by the vehicle speed sensor 12 and a traveling direction detected by the gyro sensor 13 are accumulated to determine the estimated position of the vehicle. Road map information is stored in the map database 16. The map database 16 is a table-defined database which associates a node (an intersection node, for example) and a link (i.e., a road connecting between nodes) according to an actual road network. A node table includes a number allocated to each node, its coordinates, the number of links originating from the node and link numbers thereof. Further, a link table includes a number allocated to each link, a start node and an end node comprising each link, a length of each link, a direction of each link, etc. Thus, a road network can be formed by tracking the node numbers and the link numbers, respectively.

The position determination part 15 refers to the map database 16 based on the estimated vehicle position, applies a map-matching technique for extracting the road corresponding to the position where the vehicle currently drives, and extracts the link number of the road corresponding to the road on which the vehicle currently drives. It is noted that a node of an intersection is referred to as an intersection node hereafter.

The clock of the control part 20 holds the current time obtained by integrating clock signals of the CPU of the microcomputer while correcting the time by receiving clock information from an electric wave clock which distributes the clock information, for example. The right and left turn data editing part edits the time taken to turn right or turn left whenever the vehicle enters the separate link through a right or left turn such that the time is associated with the traffic event, and stores the edited probe data in the probe data accumulating part 19. The probe data transmission part 21 transmits the probe data to the traffic information distribution center 2 via the roadside beacon 5 or mobile phone networks.

Further, the processing part 30 includes a route search part 24 which is implemented by a program performed by the CPU of the microcomputer, a right and left turn cost table reception part 22, a probe traffic information reception part 27, and a right and left turn cost table storage part 23 configured by the storage means of the microcomputer. Further, the processing part 30 is connected to an input part 25 and an output part 26. The right and left turn cost table reception part 22 stores the right and left turn cost table which the traffic information distribution center generates in the right and left turn cost table storage part 23. Further, the probe traffic information reception part 27 receives the probe traffic information including travel time in real time distributed by the traffic information distribution center 2.

The input part 25 includes a keyboard, a touch panel, a speech input device, etc., for inputting a goal in the navigation system or the like, and the output part 26 is a LCD display for displaying a road map and speakers for guiding along the route in an audio manner. The route search part 24 searches for a route from the current position detected by the position determination part 15 to the goal once the goal is input, for example, using the Dykstra method, for example, and searches for the route which provides the minimal arrival time using the right and left turn cost table as described below.

[Probe Data]

Figure 3:
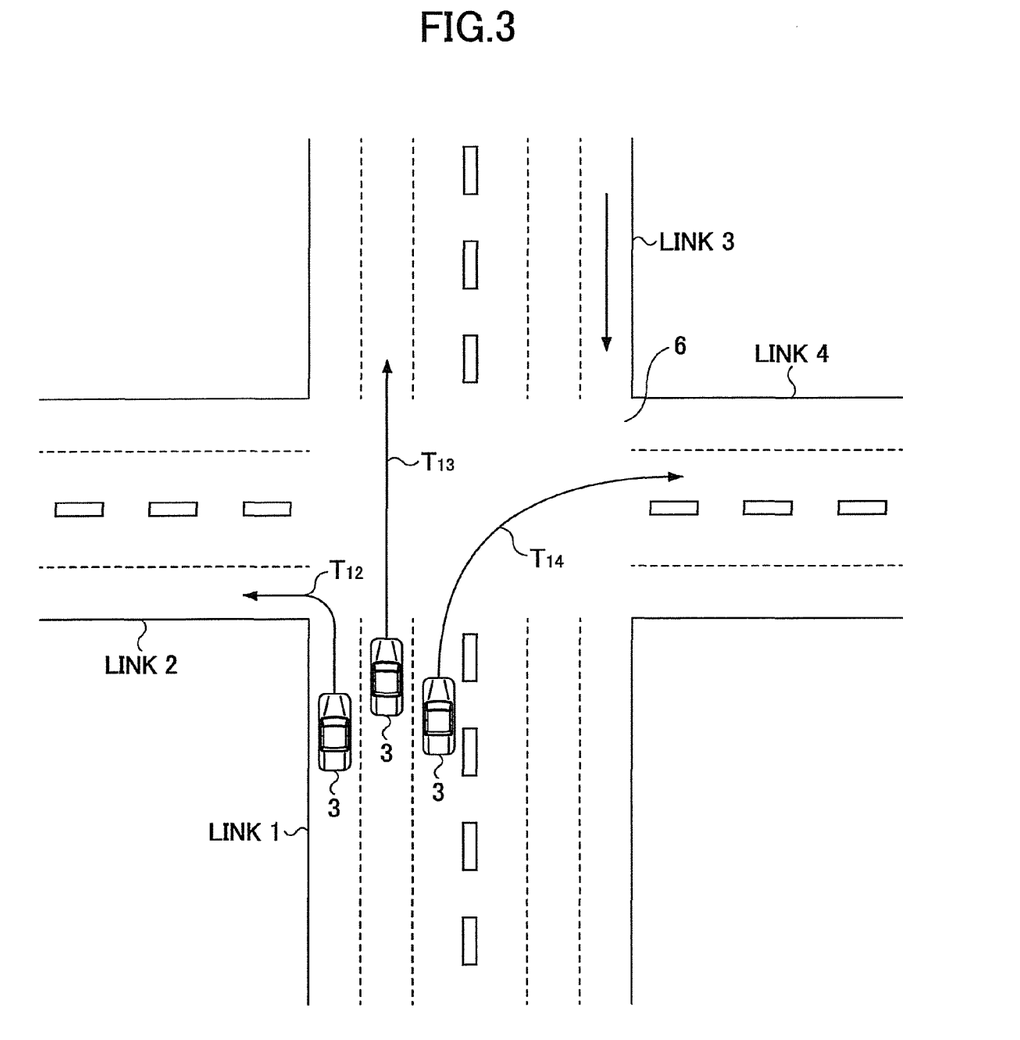
FIG. 3 is a diagram for schematically illustrating an intersection at which a probe car turns left, proceeds straight forward, or turns right.

The probe data is described with reference to FIG. 3 and FIGS. 4A and 4B. FIG. 3 is a diagram for schematically illustrating an intersection node 6 at which the probe car 3 enters the link 2 from the link 1 (i.e., left turn), enters the link 3 from the link 1 (i.e., straight forward travel), and enters the link 4 from the link 1 (i.e., right turn), respectively. With the map-matching technique the position determination part 15 detects that the probe car 3, which has been traveling on the link 1, has entered the link 2 through the left turn. The detection is performed in the same manner in the case of the straight forward travel and the right turn.

Here, if the probe car 3 summarizes the right and left turn cost of every link, the travel time of the link 1 is different, i.e., the travel time T13 in the case of straight forward travel, the travel time T12 in the case of the left turn, and the travel time T14 in the case of the right turn. The travel time T12 in the case of the left turn is influenced by the traffic event of the link 2. For example, if there is a traffic jam in the link 2, the left turn involves difficulty and thus the travel time T12 in the case of the left turn becomes longer. Further, for example, in the case of the right turn, it is influenced by the traffic event of the link 4 and the traffic event of the link 3 which link 3 constitutes an opposite lane. For this reason, in order to utilize the right and left turn time of this probe car 3 later, it is necessary to associate the traffic event of the link 2 (in the case of the left turn) with the travel time T12 and the traffic events of the links 3 and 4 (in the case of the right turn) with the travel time T14.

It is noted that the right and left turn cost required additionally for the right and left turn corresponds to an increased amount with respect to the link travel time Tv in the case of the straight forward travel provided by the VICS. Thus, the right and left turn data editing part 18 associates the travel time T12 in the case of the left turn with the link travel time Tv, and associates the travel time T14 in the case of the right turn with the link travel time Tv.

Figure 4A:
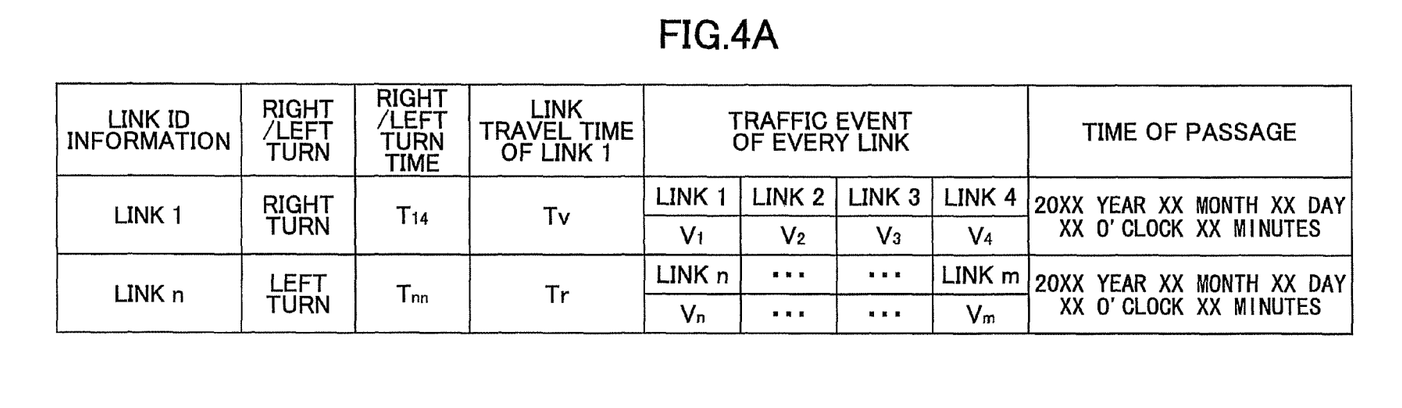
FIGS. 4A and 4B are diagrams for illustrating an example of probe data.
Figure 4B:
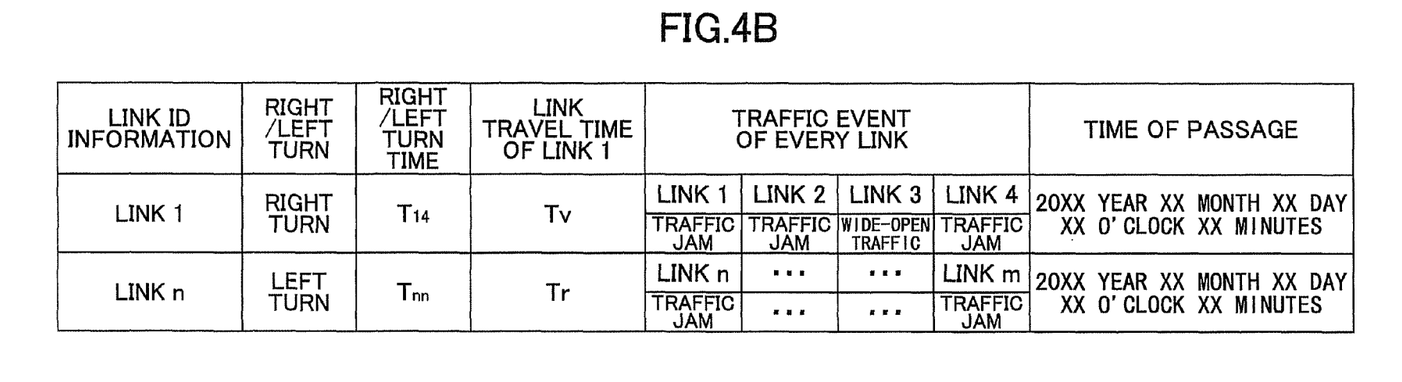

FIGS. 4A and 4B show examples of the probe data edited by the right and left turn data editing part 18. FIG. 4A shows the probe data in the case of the right turn from the link 1, in which the travel time T14 of "right and left turn time", "link travel time of link 1" Tv obtained from VICS, "traffic event of every link" and "time of passage" of the intersection node 6 are shown. It is noted that regarding "traffic event of every link", the traffic events of the all links are shown in FIGS. 4A and 4B since the link which requires the traffic event depends on a traffic law or the like such as a higher priority put on the left turn.

The traffic event is described. The traffic event is a degree of traffic jam, a link passage speed, or a link travel time or the like from which the degree of traffic jam can be derived. The right and left turn data editing part 18 calculates the link passage speed based on the link travel time and a link length of each link, and stores it in the probe data as shown V1-V4 in FIG. 4A.

Further, in the case of the degree of traffic jam, it is possible to define several steps (3 or 6 steps in this embodiment) based on the link passage speed.
1. Traffic Jam:
   1; heavy traffic jam: 0 km/h-5 km/h
   2; light traffic jam: 5 km/h-10 km/h
2. Heavy Traffic
   3; busy traffic: 10 km/h-15 km/h
   4; light traffic: 15 km/h-20 km/h
3. Wide-Open Traffic:
   5; speedy traffic 1: 20 km/h-30 km/h
   6; speedy traffic 2: over 30 km/h FIG. 4B shows an example of the probe data in which the traffic events are represented by the degree of traffic jam so defined.

Further, if a link travel time is the traffic event, the link travel time provided by the VICS is stored in the traffic event of each link.

If the traffic event is a link passage speed, the traffic information distribution center 2 determines the degree of traffic jam. If the traffic event is a link travel time, the traffic information distribution center 2 extracts the link length from the map database 16 stored in advance and determines the link passage speed or the degree of traffic jam.

It is noted that the traffic event differs in the case of entering the link 3, 4 and 1 from the link 2, respectively, even at the same intersection node 6. Thus, the probe data shown in FIGS. 4A and 4B is accumulated for every link connecting to one intersection node 6.

Further, "link travel time of link 1" and "traffic event of every link" may be acquired by the traffic information distribution center 2.

The probe data transmission part 21 transmits the probe data thus accumulated to the traffic information distribution center 2 at a predetermined timing (every time when the vehicle passes through the road side beacon 5, every time when the vehicle enters the link, when a predetermined amount of the probe data is accumulated, etc.).

[Traffic Information Distribution Center 2]

Next, the traffic information distribution center 2 is described. The traffic information distribution center 2 is implemented substantially by a computer and corresponds to a travel time calculation server in appended claims. This server has a CPU for executing programs, storage means (a hard disk drive) for storing the programs, ROM in which programs for starting up the OS or setup information are stored, RAM which provides operational space for temporarily storing the programs, and communication modules such as a NIC (Network Interface Card) for connecting to networks, each of them being connected to the others via a bus.

Figure 5:
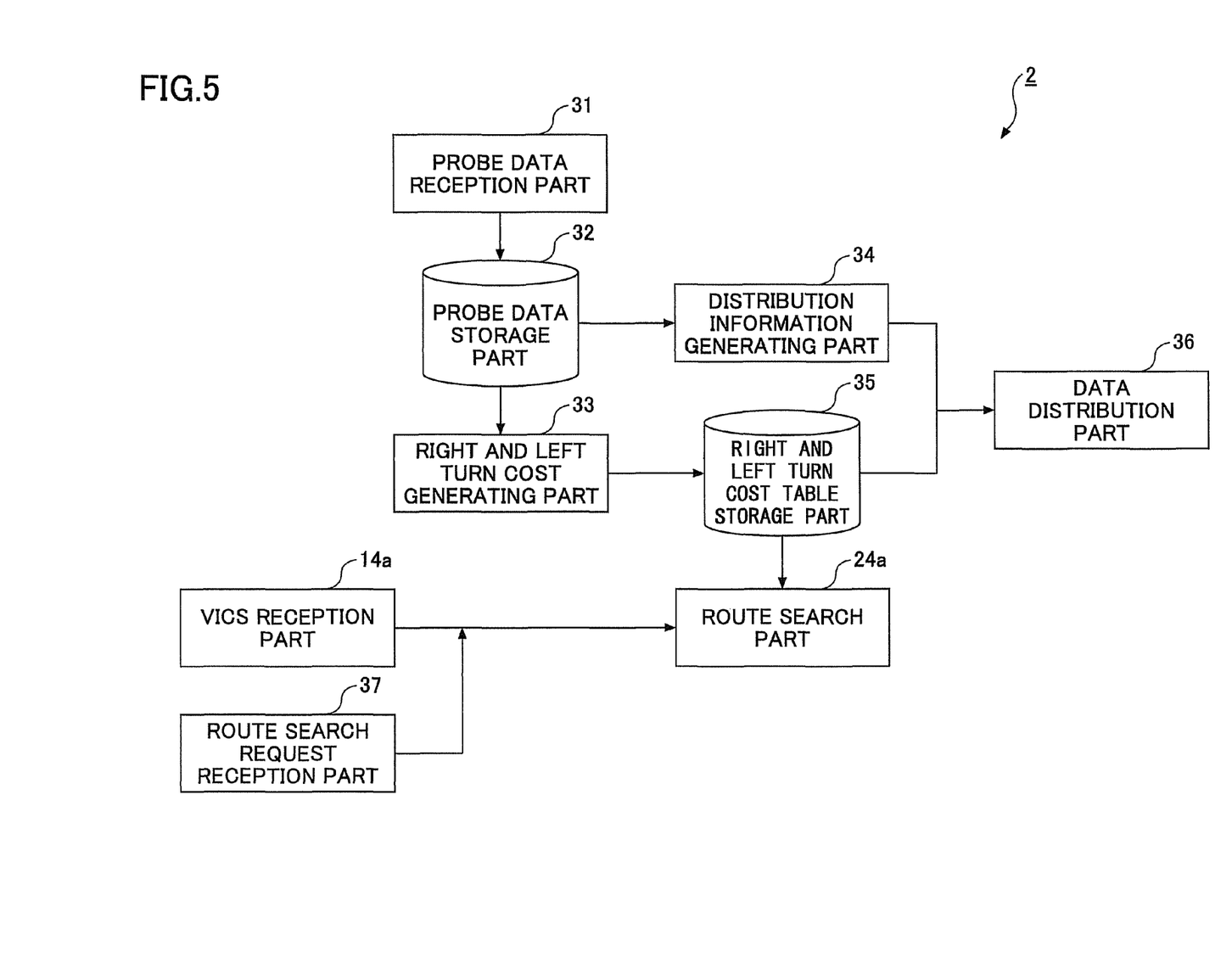
FIG. 5 is a functional block diagram of a traffic information distribution center.

FIG. 5 shows a functional block diagram of the traffic information distribution center 2. A probe data reception part 31, a right and left turn cost generating part 33, a distribution information generating part 34, a data distribution part 36 and a route search part 24a are implemented by programs performed by the CPU which constitutes the traffic information distribution center 2. A probe data storage part 32 and a right and left turn cost table storage part 35 are configured by the storage means.

The route search part 24a and a VICS reception part 14a have the same configurations as those in the probe car 3 and search for the route toward the goal in accordance with the route search request from the probe car 3 received by the route search request reception part 37.

The traffic information distribution center 2 receives the probe data from the probe car 3 which travels each link, calculates an average travel time of each link, and distributes it to the probe car 3 as the probe traffic information. The probe traffic information has an advantage that it may be obtained only if the probe car 3 travels the road. On the other hand, VICS provides information about only highway roads and roads with relatively high traffic. Further, since the calculation of the travel time by VICS requires a predetermined time to lapse, it is possible to obtain an accurate travel time by correcting the previous travel time by means of the probe information as to the links the vehicle is going to travel.

However, in fact, the probe car 3 doesn't always travel the node for which the travel time for calculating the arrival time is desired. For this reason, the traffic information distribution center 2 accumulates the probe data (i.e., the right and left turn cost). In this way, the traffic information distribution center 2 can precisely calculate the arrival time by extracting the right and left turn cost according to the traffic events in real time from the accumulated right and left turn costs.

The probe data reception part 31 stores the probe data transmitted from the probe car 3 in the probe data storage part 32. The probe data stored in the probe data storage part 32 has the same information as the probe data transmitted from each probe car 3. The right and left turn cost generating part 33 generates the right and left turn cost using a method described below and stores a right and left turn cost table in the right and left turn cost table storage part 35.

The distribution information generating part 34 generates the probe traffic information. The probe traffic information is travel time in real time and right and left turn costs in real time. The distribution information generating part 34 extracts and uses only the probe traffic information (i.e., the travel time and the right and left turn cost) within a predetermined time period from the time (10-30 minutes, for example) when the vehicle passes through the link.

The data distribution part 36 distributes the right and left turn cost table stored in the right and left turn cost table storage part 35 and the probe information in real time to the probe car 3. In the case of distributing the right and left turn cost table, it is possible to save the distribution time and the storage area of the probe car 3 by distributing the right and left turn cost table which matches with the traffic event in real time or in nearly real time.

[Generation of Right and Left Turn Cost]

Next, the generation of the right and left turn cost is described. It is thought that the right and left turn cost has a large dependency on the traffic events, and that the right and left turn cost is influenced by the number of the pedestrians who across a pedestrian crossover in the case of the right or left turn even if the traffic events are substantially the same. Further, it is thought that even the traffic events are substantially the same, the fact that drivers (so-called Sunday drivers, for example) on Sunday or holiday are different from those on week days can influence on the right and left turn cost.

For this reason, the traffic information distribution center 2 generates the right and left turn cost table on a cost factor basis which factors may have any influence on the right and left turn cost. The cost factor is a time period, a season, a day of the week, a national or public holiday, year end and new year, golden week, Bon festival, the weather or the like.

Time period: every 30 minutes (48 factors)
Season: spring, summer, autumn, winter, year end and new year, golden week and Bon festival (7 factors)
A day of the week: Monday, Tuesday, Wednesday, Thursday, Friday, Saturday, Sunday and holidays (8 factors)
Weather: sunny, rainy and snowy (3 factors)

Therefore, for example, the right and left turn cost table is generated for every link connecting to the intersection node 6, and thus total 8064 (=48*7*8*2) right and left turn cost tables are generated.

Figure 6:
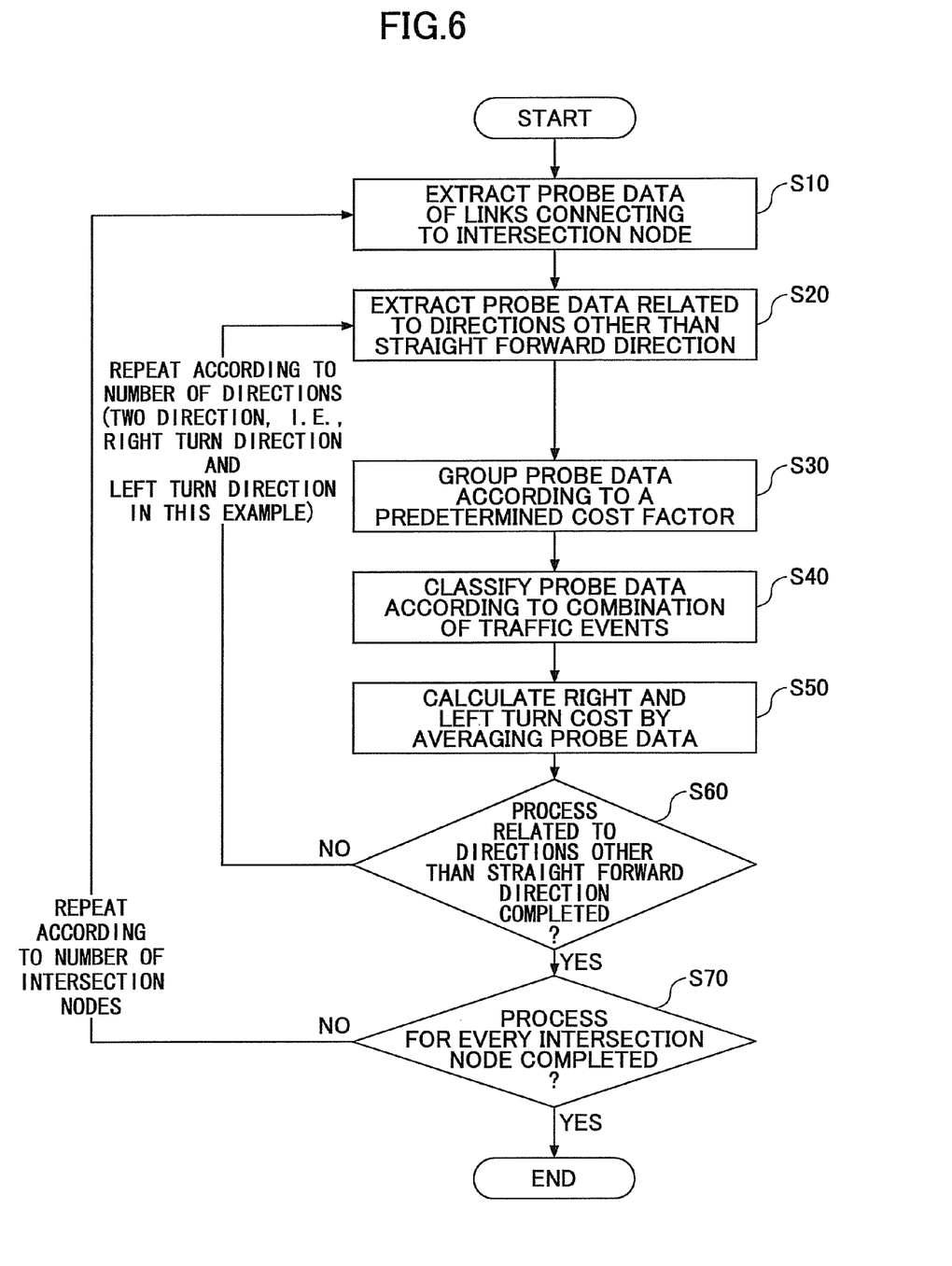
FIG. 6 is a flowchart of a process procedure of a right and left turn cost generating part for generating a right and left turn cost.

FIG. 6 is a flowchart of a process procedure of the right and left turn cost generation part 33 for generating the right and left turn cost. The process shown in FIG. 6 is executed every time period (every 30 minutes) or when the predetermined amount of the probe data is accumulated, for example.

In order to perform the process on an intersection 6 basis, the right and left turn cost generating part 33 extracts the probe data related to all the links connecting to a predetermined intersection 6 from the probe data storage part 32 (S 10). For example, the probe data stored as to the links 1-4 are extracted in the case of FIG. 3.

Then, the right and left turn cost generating part 33 extracts the probe data related to directions (i.e., right turn, left turn) other than the straight forward direction from the predetermined links in sequence (S 20). For example, assuming that the right and left turn cost of the left turn is calculated, the probe data from the link 1 to the link 2 (i.e., the left turn) is extracted.

Then, the right and left turn cost generating part 33 groups the extracted probe data according to the relevant cost factor (S 30). For example, grouping into a time period, a season and a day of the week is performed using calendar information which the traffic information distribution center 2 has based on the "time of passage". With this process, the probe data is grouped into the right and left turn cost table of 12:00-12:30 on Wednesday during the spring, for example. The number of items of the probe data which are grouped into the same cost factor may often be more than two depending on the traffic.

Then, the right and left turn cost generating part 33 classifies the probe data for every combination of the traffic events (S 40). Specifically, in the case of the left turn, the traffic events of the original link 1 and the next link 2 have influence on the travel time of the left turn, and thus the combination of the degree of traffic jam of the link 1 and the degree of traffic jam of the link 2 is used.

If the degree of traffic jam in the case of the left turn is defined by three steps, that is to say, traffic jam, heavy traffic and wide-open traffic, with respect to the link 1 and link 2, respectively, a classification into 9 (=3*3) total combinations is possible.

Once the right and left turn cost generating part 33 classifies the probe data according to the combination of the traffic events, the right and left turn cost generating part 33 calculates the right and left turn cost associated with the combination of the traffic events by averaging plural items of the probe data (S 50).

The right and left turn cost generating part 33 calculates the right and left turn cost in the case of the left turn by subtracting the travel time Tv of "link travel time of link 1" of the link 1 from the travel time T12 of "right and left turn time". Assuming that the right and left turn cost in the case of the left turn is X, X (sec)=T12−Tv.

The right and left turn cost generating part 33 averages X of the plural items of the probe data, and stores the average as the right and left turn cost associated with the relevant combination of the traffic events in the right and left turn cost table of the relevant cost factor.

Then, the right and left turn cost generating part 33 determines whether the process for all the directions other than the straight forward direction is completed (S 60). If it is determined that the process for all the directions other than the straight forward direction is not completed, the process from S 30 is repeated.

Since the process for the right turn remains in the case of the intersection 6 shown in FIG. 3, the right and left turn cost in the case of the right turn is calculated. In the case of the right turn, since not only the traffic event of the next link but also the traffic event of the link 3 which constitutes the opposite lane have influence on the travel time of the right turn, the combination of the traffic events is also related to the traffic event of the link 3.

Here, with respect to the traffic event of the link 3, it is possible to smoothly turn right if traffic is light in the opposite lane or a terrible traffic jam occurs in the opposite lane, while it is difficult to smoothly turn right if there are many cars whose speeds are high to some extent in the opposite lane. Therefore, the degree of traffic jam is defined by six steps with respect to the opposite lane.

1. Heavy traffic jam: since the cars in the opposite lane are substantially at a standstill, the travel time of the right turn is short.
2. Light traffic jam: the travel time of the right turn is long because there are many cars in the opposite lane, though the speed of the cars is not high in the opposite lane.
3. Busy traffic: the travel time of the right turn is long because there are many cars in the opposite lane, though the speed of the cars is not high in the opposite lane.
4. Light traffic: the travel time of the right turn is long because there are many cars in the opposite lane, though the speed of the cars is not high in the opposite lane.

5. Speedy traffic 1: the travel time of the right turn is long because there are many cars in the opposite lane and the speed of the cars is high in the opposite lane.

6. Speedy traffic 2: since there are few cars in the opposite lane, the travel time of the right turn is short.

Thus, in the case of the right turn, since the combination can be formed by traffic jam/heavy traffic/wide-open traffic with respect to the link 1, traffic jam/heavy traffic/wide-open traffic with respect to the link 4, and heavy traffic jam/light traffic jam/busy traffic/light traffic/speedy traffic 1/speedy traffic 2, a classification into 54 (=3*3*6) total combinations is possible.

Once the right and left turn cost generating part 33 classifies the probe data according to the combination of the traffic events, the right and left turn cost generating part 33 calculates the right and left turn cost in the case of the right turn by subtracting "link travel time of link 1" Tv from the travel time T14 of "right and left turn time". Assuming that the right and left turn cost in the case of the right turn is Y, Y (sec)=T14−Tv.

Then, the right and left turn cost generating part 33 determines whether the process for all the stored probe data is completed (S 70). If it is determined that the process for all the stored probe data is not completed, the right and left turn cost generating part 33 calculates the right and left turn cost of the next intersection node in the same manner.

Figure 7:
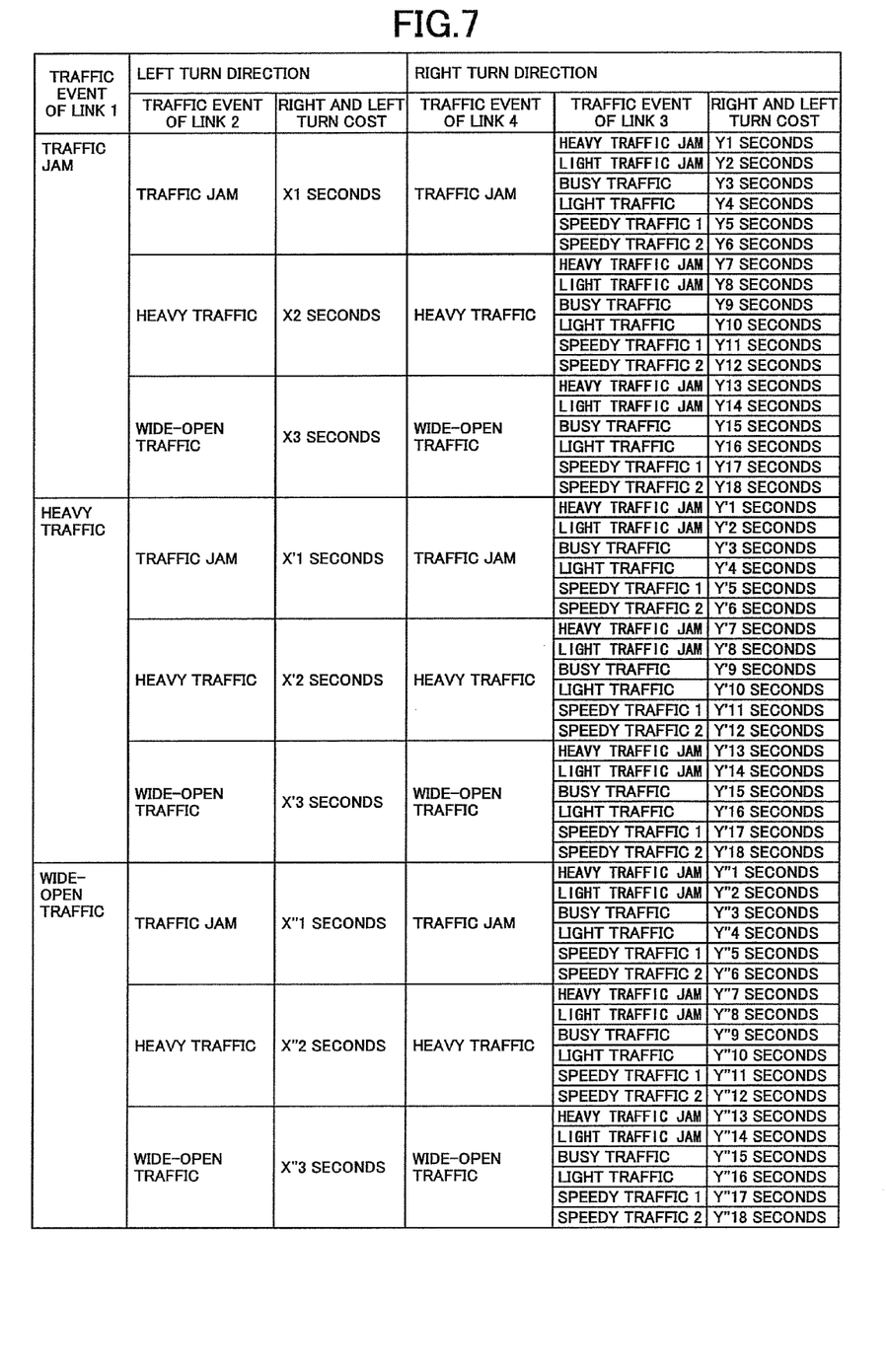
FIG. 7 is a diagram for illustrating an example of a right and left turn cost table.

FIG. 7 shows an example of the right and left turn cost table. The right and left turn cost table shown in FIG. 7 is the table corresponding to the predetermined cost factors, and thus there are 8063 other separate similar right and left turn cost tables. As is described in connection with the flowchart of FIG. 6, 9 right and left turn costs according to the combination of the traffic events in the case of the left turn and 54 right and left turn costs according to the combination of the traffic events in the case of the right turn are stored in the right and left turn cost table.

The right and left turn cost generating part 33 stores the generated right and left turn cost in the right and left turn cost table storage part 35, distributes the right and left turn cost table to the probe car 3 via the road side beacon 5 and FM multiplex broadcasting, and distributes it to a particular probe car 3 via the mobile phone networks or the like.

[Route Search]

Next, the route search utilizing the right and left turn cost table is described. In the case where each probe car 3 performs the route search, each probe car 3 stores the right and left turn cost table in advance. Further, since the right and left turn cost table is made on a cost factor basis, the data distribution part 36 may distribute the relevant right and left turn cost table every day or every time period, for example.

Figure 8:
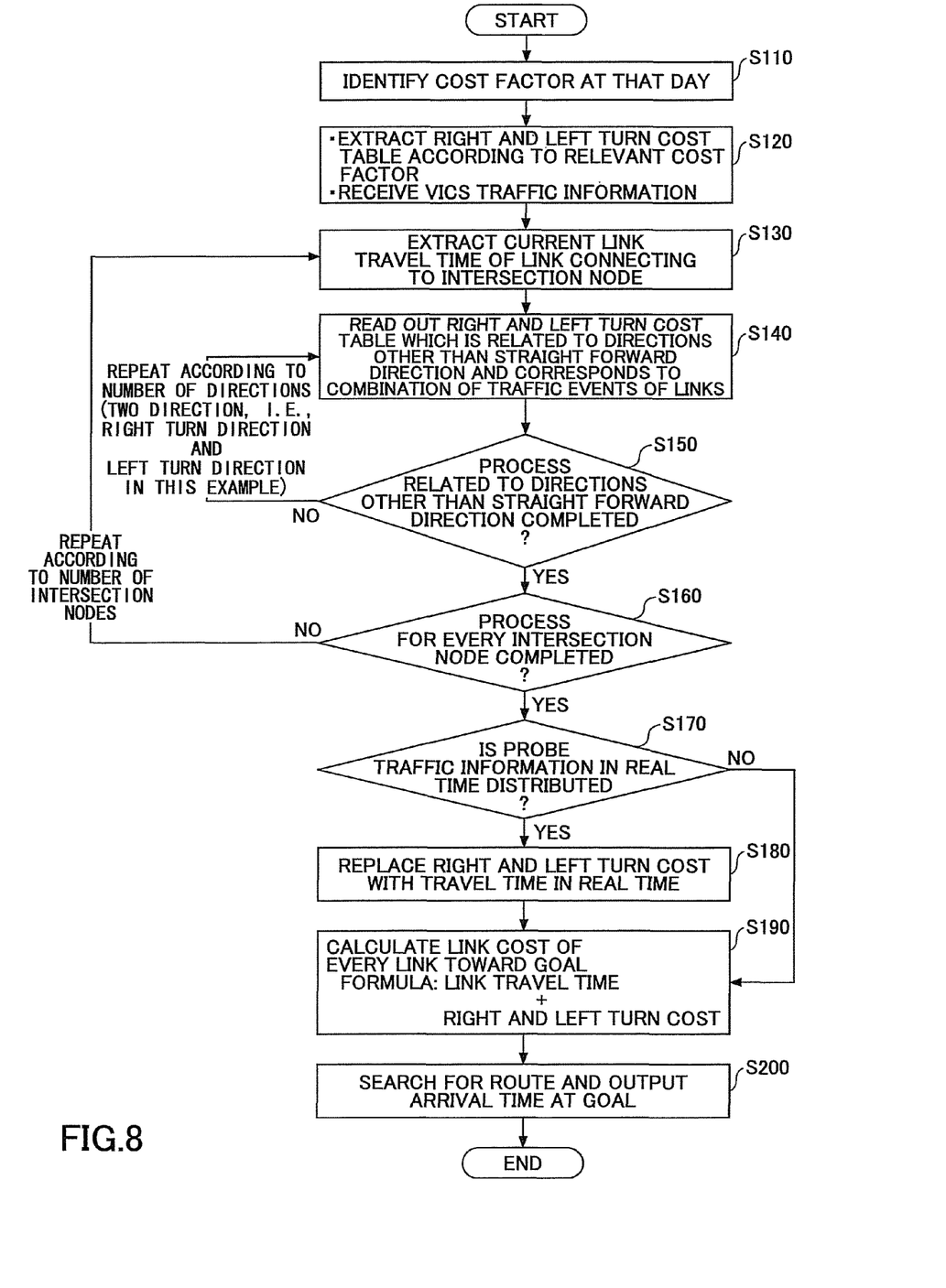
FIG. 8 is a flowchart of a process procedure of a route search part for searching for a route.

FIG. 8 is a flowchart of a process procedure of the route search part 24 for searching for a route. The process shown in FIG. 8 starts when the occupant of the probe car 3 inputs the goal via the input part 25, for example.

First of all, the route search part 24 identifies the cost factor at the day (S 110). The route search part 24 identifies the cost factor on the day based on the clock 17 and the calendar information, such as "spring, Monday, ten o'clock, and sunny", for example.

Then, the route search part 24 extracts the right and left turn cost table associated with the cost factor on the day from the right and left turn cost table storage part 23 (S 120). Further, the VICS reception part 14 receives the VICS traffic information (i.e., a link travel time, traffic restrictions, traffic jam information, etc.) of the day distributed by VICS.

Next, the route search part 24 extracts the link travel time in real time of the links connecting to the intersections 6 (S 130). These intersection nodes 6 are all the intersection nodes 6 located in the possible routes toward the goal, but it may be possible to limit the intersection nodes 6 within a predetermined area including the intersection node 6 at the current vehicle position and the intersection node 6 at the goal. The route search part 24 selects the intersection nodes 6 in sequence from the nearest intersection node 6, and extracts the link travel time in real time of the link connecting to the selected intersection nodes 6.

Then, the route search part 24 reads out from the right and left turn cost table the right and left turn cost for entering every intersection node 6 along the direction other than the straight forward direction, which right and left turn cost matches with the combination of the traffic events of the links (S 140). In other words, in the case of the right and left turn cost of the left turn, the right and left turn cost which matches with the combination of the degree of traffic jam of the link 1 and the degree of traffic jam of the link 2 is extracted. For example, assuming that there is a traffic jam in the link 1 and the link 2 according to the link travel time, the right and left turn cost is X1 [sec] according to FIG. 7. Similarly, the route search part 24 extracts the right and left turn cost at the right turn (S150). If the link 3 indicates the heavy traffic jam and the link 4 indicates the traffic jam, the right and left turn cost is Y1 [sec] according to FIG. 7.

If the right and left turn cost of the predetermined intersection node 6 is extracted, the right and left turn cost is extracted similarly for the respective intersection nodes 6 toward the goal (S160).

If the right and left turn cost is extracted for all the intersection nodes 6 toward the goal (Yes in S 160), the route search part 24 determines whether the travel time of the right turn or the left turn at any intersection node 6 is distributed as probe traffic information in real time (S 170).

If it is determined that the traffic information in real time is distributed (Yes in S 170), the right and left turn cost read out in step 140 is replaced with the travel time in real time (S 180). This replacement doesn't involve replacing the right and left turn cost table stored in the right and left turn cost table storage part 23, but involves replacing the right and left turn cost in the RAM, for example, extracted for the route search. If there is probe traffic information in real time, it is possible to predict a more accurate arrival time utilizing this information.

The route search part 24 calculates the link cost of each link toward the goal, using the extracted right and left turn cost if it is determined that the traffic information in real time is not distributed (No in S 170), and using the travel time in real time if the right and left turn cost is replaced with the probe traffic information in real time (S 190).

Since the link travel time of each link toward the goal is extracted from the VICS traffic information, and the right and left turn cost for the right and left turn along the directions other than the straight forward direction is extracted from the right and left turn cost table or obtained in real time, the link travel time (in the case of the straight forward) and the link travel time plus the right and left turn cost (in the case of other than the straight forward) can be a link cost of each link.

Then, the route search part 24 searches for the route which minimizes the arrival time at the goal using the link costs, and outputs the arrival time together with the route via the output part 26 (S 200). Thus, since the link cost in real time is precisely calculated even in the route having right or left turn at the intersection node 6, it is possible to precisely search for the route which minimizes the arrival time.

It is noted that the route search may be executed by the traffic information distribution center 2 or a predetermined server. Since the probe data is accumulated in the traffic information distribution center 2 and the probe data is transmitted in real time, it is possible to more precisely search for the route.

If the probe car 3 or the occupant therein desires to search for the route which reflects the right and left turn cost, the route search request reception part of the traffic information distribution center 2 receives the current position information and the goal information from the probe car 3 via the mobile phone networks, for example. The process is the same as the process at the side of the probe car 3 from then on. The route search part 24*a* transmits the searched route to the probe car 3 via the mobile phone networks, for example. Since the traffic information distribution center 2 need not distribute the right and left turn cost table to the probe car 3, it is possible to reduce the processing work load.

As is described above, according to the travel time calculation system 1 of the present embodiment, the right and left turn cost associated with the traffic events is accumulated, and the right and left turn cost is extracted according to the traffic events in real time when recognition of the travel time of the right or left turn is desired. With this arrangement, it is possible to precisely recognize the right and left turn cost and precisely search for the route which minimizes the arrival time at the goal. Further, in the case where the right and left turn cost table is generated on a cost factor basis, it is possible to more precisely search for the route.

[Display of Travel Time]

The right and left turn cost can be used as the traffic information other than for the route search. Since the intersection node 6 in the traveling direction, for example, is clear from the position of the probe car 3, the route search part 24 extracts the right and left turn cost table which corresponds to the cost factor in real time of the intersection node 6 and extracts the right and left turn cost according to the combination of the traffic events obtained from the link travel time. Thus, for the probe car 3 the travel time of the left turn direction, the right turn direction and the straight forward direction becomes clear on an intersection node 6 basis. If each travel time is displayed on the output part 26, the driver of the probe car 3 can utilize it as material for determining which direction to proceed, resulting in a reduction in traffic jam.

For example, if the link travel time indicates that the links 1, 2 and 4 have traffic jams and the link 3 has a heavy traffic jam, according to FIG. 7 the travel time of each direction is as follows:

Straight forward direction: link travel time=A [sec]
Left turn direction: link travel time+X1=B [sec]
Right turn direction: link travel time+Y1=C [sec]

Figure 9A:
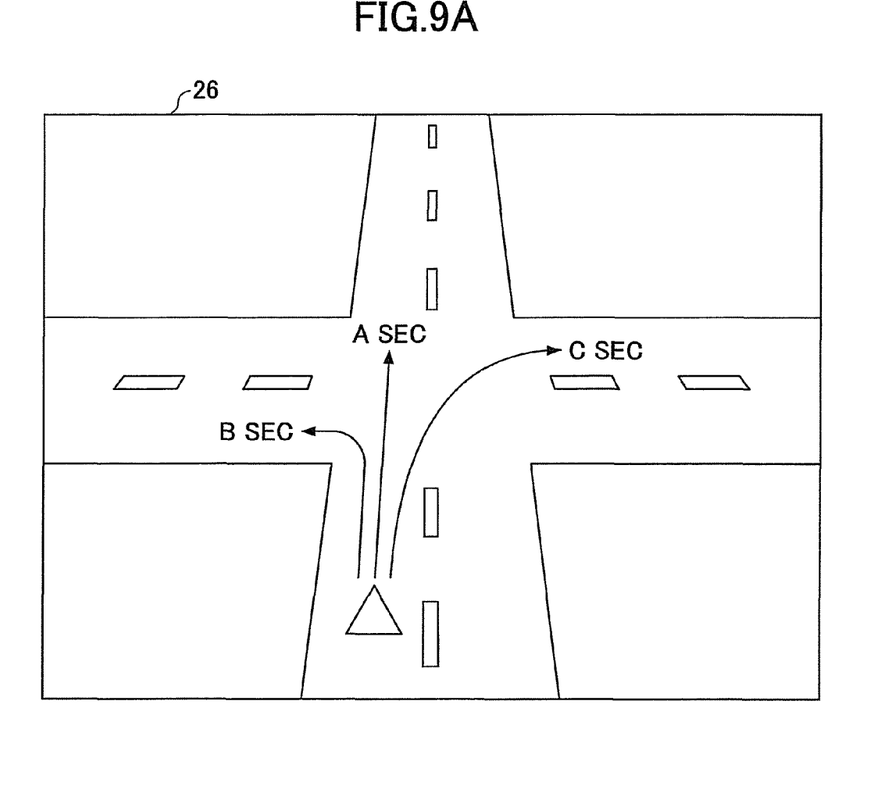
FIGS. 9A and 9B are diagrams for illustrating examples of displayed travel time.

FIG. 9A shows an example of the travel time displayed on the output part 26. For example, if the travel time C [sec] of the right turn direction is extremely longer than the travel time A [sec] of the straight forward direction, the driver may be urged to pay an attention by flashing it. It is noted that the probe car 3 may store the right and left turn cost table storage part 23 in advance or receive the right and left turn cost table within a recordable amount of data from the traffic information distribution center 2.

Further, instead of displaying the travel time, the audio message, for example, "it takes A seconds for straight forward, B seconds for left turn and C seconds for right turn" may be output.

Figure 9B:
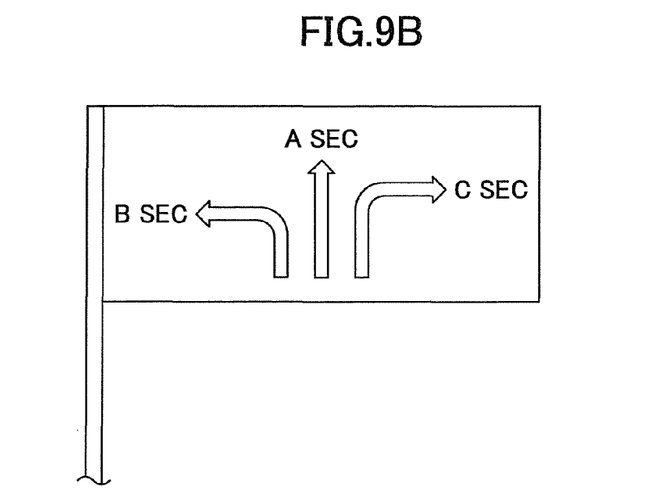

Further, the travel time may be displayed on the sign board with lamp provided at the road side instead of the cabin of the probe car 3. FIG. 9B shows an example of the travel time displayed on the sign board with lamp. In the case of displaying on the sign board with lamp at the road side, it can be useful information for all the vehicles which pass through the intersection node. Thus, it is proffered that the traffic information distribution center 2 instead of the probe car 3 calculates the right and left turn cost and distributes it to the sign board with lamp.

The data distribution part 36 of the traffic information distribution center 2 extracts the right and left turn cost table corresponding to the cost factor in real time and extracts the right and left turn cost according to the combination of the traffic events obtained from the link travel time. The data distribution part 36 distributes the extracted right and left turn cost as is the case with the VICS or the like and displays it.

As is described above, the travel time calculation system 1 of the present embodiment utilizes the travel time of the intersection nodes 6 previously accumulated according to the traffic events in real time of the links connecting to the respective intersection nodes 6. Therefore, the travel time calculation system 1 of the present embodiment can precisely predict the arrival time even when the travel time in real time is not available.

It is noted that the terms "left turn", "right turn", or the like are used assuming that the present invention is implemented where the left side of the road is used for driving. However, where the right side of the road is used for driving, the terms "left turn", "right turn", or the like should be construed reversely.

The present application is based on Japanese Priority Application No. 2007-047544, filed on Feb. 27, 2007, the entire contents of which are hereby incorporated by reference.

The invention claimed is:

1. A travel time calculation server, comprising:
a probe data reception part configured to receive travel time data of an intersection node through which a vehicle passes as well as a traffic event of each of links connecting to the intersection node; and
a right and left turn cost generating part programmed to store a table on an intersection node basis in a storage device, said table storing the travel time data of the intersection node associated with a combination of a traffic event of the link entering the intersection node and a traffic event of the link connected to the intersection node in a left turn direction, and a combination of a traffic event of the link entering the intersection node, a traffic event of the link connected to the intersection node in a right turn direction and a traffic event of the link opposite to the link entering the intersection node.

2. The travel time calculation server as claimed in claim 1, further comprising:
a current traffic event acquisition device configured to acquire current traffic events of the links; and
a route search part configured to extract the intersection node included in a route toward a predetermined goal, wherein
the route search part extracts the current traffic events of the links connecting to the intersection node in the route from the current traffic events acquired by the current traffic event acquisition device, and predicts an arrival time at the goal using the travel time data extracted from the table, said travel time data being extracted according to the combination of the current traffic events of the links.

3. The travel time calculation server as claimed in claim 1, wherein the right and left turn cost generating part is programmed to generate, on an intersection node basis, right and left turn costs based on the probe data, and stores a right and left turn cost table, which stores the generated right and left turn costs associated with combinations of traffic events of the links, in the storage device.

4. The travel time calculation server as claimed in claim 1, wherein the traffic event is degree of traffic jam consisting of traffic jam, heavy traffic and wide-open traffic.

5. The travel time calculation server as claimed in claim 1, wherein the traffic event is link travel time or link passage speed of the link connecting to the intersection node.

6. The travel time calculation server as claimed in claim 1, wherein the right and left turn cost generating part is programmed to store the table in the storage device on a cost factor basis, said cost factor being at least one of a time period, a season and a day of the week.

7. The travel time calculation server as claimed in claim 2, further comprising: a route search request reception part configured to receive current vehicle position information and goal information from the vehicle, wherein
the route search part predicts the arrival time at the goal of the goal information and notifies the vehicle of the predicted arrival time.

8. The travel time calculation server as claimed in claim 2, wherein the server extracts time data of time required for right turn or left turn from the travel time data extracted from the table according to the combination of current traffic events, and transmits the extracted time to a vehicle which outputs the extracted time in an audio or visual manner, or transmits the extracted time to road side facilities.

9. The travel time calculation server as claimed in claim 2, wherein the route search part predicts the arrival time at the goal using the travel time data which the probe data reception part receives instead of using the travel time data stored in the table, as far as the intersection node whose travel time data is received by the probe data reception part is concerned.

10. A travel time calculating apparatus used for a vehicle for predicting an arrival time at a goal, comprising:
a right and left turn cost generating part programmed to store a table on an intersection node basis in which travel time data of the intersection node is stored in such a manner that the travel time data is associated with a combination of a traffic event of the link-entering the intersection node and a traffic event of the link connected to the intersection node in a left turn direction, and a combination of a traffic event of the link entering the intersection node, a traffic event of the link connected to the intersection node in a right turn direction and a traffic event of the link opposite to the link entering the intersection node;

a current traffic event acquisition device configured to acquire current traffic events of the links; and
a route search part configured to extract the intersection node included in a route to the goal, wherein
the route search part extracts the current traffic events of the links connecting to the intersection node in the route from the current traffic events acquired by the current traffic event acquisition device, and predicts the arrival time at the goal using the travel time data of the intersection node extracted from the table according to the combination of the current traffic events.

11. A travel time calculation system comprising a travel time calculation server and a vehicle, wherein
the travel time calculation server includes
a reception part configured to receive travel time data of an intersection node through which a vehicle passes, and a traffic event of each of links connecting to the intersection node; and
a right and left turn cost generating part programmed to store a table on an intersection node basis in a storage device, which table stores the travel time data of the intersection node associated with a combination of a traffic event of the link entering the intersection node and a traffic event of the link connected to the intersection node in a left turn direction, and a combination of a traffic event of the link entering the intersection node, a traffic event of the link connected to the intersection node in a right turn direction and a traffic event of the link opposite to the link entering the intersection node, and
the vehicle device includes
a table reception device configured to receive the table from the travel time calculation server;
a current traffic event acquisition device configured to acquire current traffic events of the links; and
a route search part configured to extract the intersection node included in a route to a predetermined goal, wherein
the route search part extracts the current traffic events of the links connecting to the intersection node in the route from the current traffic events acquired by the current traffic event acquisition device, and predicts an arrival time at the goal using the travel time data of the intersection node extracted from the table according to the combination of the current traffic events.

* * * * *